(12) United States Patent  
Jang

(10) Patent No.: US 8,531,427 B2  
(45) Date of Patent: *Sep. 10, 2013

(54) METHOD AND APPARATUS FOR CONTROLLING INFORMATION SCROLLING ON TOUCH-SCREEN

(75) Inventor: Won Chang Jang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/610,330

(22) Filed: Sep. 11, 2012

(65) Prior Publication Data

US 2013/0002589 A1     Jan. 3, 2013

Related U.S. Application Data

(63) Continuation of application No. 13/552,350, filed on Jul. 18, 2012, now Pat. No. 8,305,356, which is a continuation of application No. 12/409,858, filed on Mar. 24, 2009, now Pat. No. 8,253,704.

(30) Foreign Application Priority Data

Aug. 12, 2008  (KR) .................................. 2008-79038

(51) Int. Cl.  
*G06F 3/041*     (2006.01)

(52) U.S. Cl.  
USPC ............ 345/173; 715/786; 715/833; 345/684

(58) Field of Classification Search  
None  
See application file for complete search history.

(56) References Cited

U.S. PATENT DOCUMENTS

| | | | |
|---|---|---|---|
| 5,553,225 | A | 9/1996 | Perry |
| 5,995,083 | A | 11/1999 | Sato et al. |
| 6,677,965 | B1 | 1/2004 | Ullmann et al. |
| 6,867,764 | B2 | 3/2005 | Ludtke |
| 7,934,169 | B2 | 4/2011 | Reponen |
| 8,194,037 | B2 | 6/2012 | Kerr et al. |
| 2010/0058226 | A1 | 3/2010 | Flake et al. |

FOREIGN PATENT DOCUMENTS

| | | |
|---|---|---|
| JP | 7-129360 | 5/1995 |
| JP | 2001-202176 | 7/2001 |
| JP | 2004-192573 | 7/2004 |
| JP | 2004-265453 | 9/2004 |

OTHER PUBLICATIONS

U.S. Notice of Allowance mailed Oct. 3, 2012 in related U.S. Appl. No. 13/552,350.  
U.S. Office Action mailed Nov. 17, 2011 in related U.S. Appl. No. 12,409,858.  
U.S. Notice of Allowance mailed Apr. 17, 2012 in related U.S. Appl. No. 12,409,858.  
English Translation of the 2001-202176, filed Jul. 27, 2011.  
U.S. Office Action mailed Aug. 24, 2012 in related U.S. Appl. No. 13,552,350.

*Primary Examiner* — Jason Olson  
(74) *Attorney, Agent, or Firm* — Staas & Halsey LLP

(57) ABSTRACT

An apparatus to control playback of multimedia contents comprising a touch screen to display an information scroll controlling bar and a scroll pointer, the information scroll controlling bar and the scroll pointer being included in an information scroll controlling region, and a controller to sense a touch at the scroll pointer on the touch screen, to sense a movement of the touch in a direction to a location outside the information scroll controlling region on the touch screen, to set a moving rate of the scroll pointer based on the sensed location outside the information scroll controlling region to control playback of multimedia contents, and to move the scroll pointer in a moving direction based on the direction of the movement.

20 Claims, 9 Drawing Sheets

METHOD AND APPARATUS FOR CONTROLLING INFORMATION SCROLLING ON TOUCH-SCREEN

CROSS-REFERENCE TO RELATED APPLICATION

This application is a continuation of U.S. application Ser. No. 13/552,350 filed Jul. 18, 2012 now U.S. Pat. No. 8,305, 356, which is a continuation of U.S. application Ser. No. 12/409,858, filed Mar. 24, 2009 now U.S. Pat. No. 8,253,704, which claims the benefit of Korean Patent Application No. 2008-79038, filed Aug. 12, 2008 in the Korean Intellectual Property Office, the disclosures of which is incorporated herein by reference.

BACKGROUND

1. Field

Aspects of the present invention relate to a method and apparatus to control contents displayed on a portable terminal, and more particularly, to a method and apparatus to control information scrolling of data on a touch screen of a portable terminal.

2. Description of the Related Art

Currently, portable terminals including a touch screen (such as personal digital assistants (PDA), portable multimedia players (PMP), MPEG audio layer-3 (MP3), and mobile phones) have been widely used. These portable terminals provide various contents including predetermined images, video signals, and/or audio signals.

In order to improve a users' convenience, the portable terminals include a graphical user interface (GUI), which includes a slider or a scroll bar to operate a contents display region. However, a technology to minutely adjust a content display region by using the slider or the scroll bar on a touch screen of the portable terminal is desirable.

SUMMARY OF THE INVENTION

Aspects of the present invention provide a method and apparatus of controlling contents scrolling on a touch screen of a portable terminal.

According to an aspect of the present invention, there is provided a method of controlling information scrolling on a touch screen, the method including: displaying an information scroll controlling region on the touch screen; sensing a touch for a scroll pointer in the information scroll controlling region and performing a dragging operation at a location of the touch on the touch screen; in response to a dragged location being out of a moving region of the scroll pointer in the information scroll controlling region, changing the information scroll controlling region; and adjusting a location to display information in response to the changing of the information scroll controlling region.

The information scroll controlling region may be a scroll bar and/or a slider.

The sensing of the touch may include: in response to the touch being sensed on the touch screen, determining whether the touched location is in the scroll controlling region; and in response the touched location being in the scroll controlling region, generating a touch starting event.

The performing of the dragging operation may include: checking whether the touched location on the touch screen is in a scroll pointer region; in response to the touched location not being in the scroll pointer region, moving the scroll pointer to the touched location; and calculating a dragged direction and/or distance of the touch from the scroll pointer.

The performing of the dragging operation may include dragging and moving the scroll pointer simultaneously.

The changing of the information scroll controlling region may be performed in response the touched point on the scroll pointer being dragged from the touched location in a direction perpendicular to a moving direction of the scroll pointer or in a diagonal direction.

The changing of the information scroll controlling region may include expanding or reducing the scroll controlling region in proportion to the dragging distance of the touch.

The changing of the information scroll controlling region may include expanding a moving region of the scroll pointer in the information scroll controlling region to the left and the right.

The changing of the information scroll controlling region may include changing a location and numerical values of standard values for the moving region of the scroll pointer in the scroll controlling region.

The changing of the information scroll controlling region may include expanding the information scroll controlling region to the left, right, upper and lower sides.

The changing of the information scroll controlling region may include setting an expansion region and a reduction region for the scroll controlling region in the upper and lower side of the touch screen, and expanding or reducing the scroll controlling region to a limit value, when the touched point on the scroll pointer is dragged to the expansion region or the reduction region.

The method may further include changing a location of the scroll pointer according to a finger performing dragging on the touch screen.

The method may further include moving the scroll pointer with an object performing dragging and representing the dragged location with a line on the touch screen.

The adjusting of the location for displaying information may include changing a location of information on the screen and/or information numerical value according to the change of the information scroll controlling region.

The method may further include returning the expanded or reduced scroll controlling region to an original scale when a termination of the touch is sensed on the touch screen.

According to another aspect of the present invention, there is provided an apparatus for controlling information scrolling, the apparatus including: a touch screen unit to display an information scroll controlling region and a scroll pointer in the information scroll controlling region, and to sense a touch thereon; a control unit to detect the touch for the scroll pointer in the information scroll controlling region displayed on the touch screen unit, to change the information scroll controlling region in response to the touch being dragged to be out of a moving region of the scroll pointer, and to adjust an information location according to the change of the information scroll controlling region.

The touch screen unit may include a graphic user interface to control the information scroll controlling region.

According to another aspect of the present invention, there is provided a computer readable recording medium having embodied thereon a computer program for executing a method of controlling information scrolling on a touch screen.

According to another aspect of the present invention, there is provided a method of controlling information scrolling on a touch screen, of a computing device, having an information scroll controlling region and a scroll pointer in the information scroll controlling region, the method including: sensing a dragging touch in the information scroll controlling region; and in response to a dragged location of the dragging touch being out of a moving region of the scroll pointer in the information scroll controlling region, changing the information scroll controlling region.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
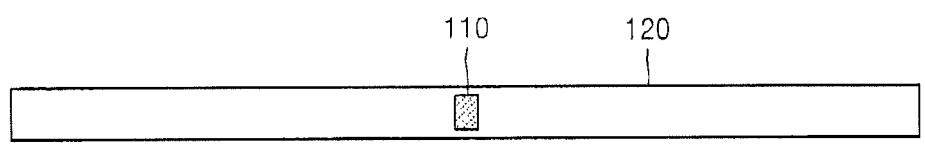
FIGS. 1A through 1D illustrate scroll bars according to embodiments of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1B:
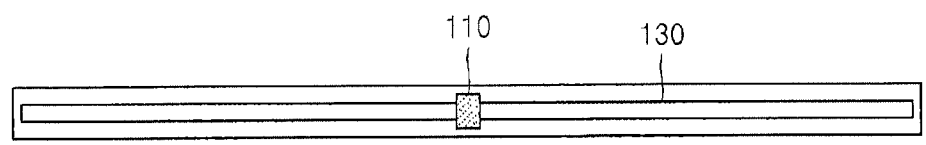
Figure 1C:
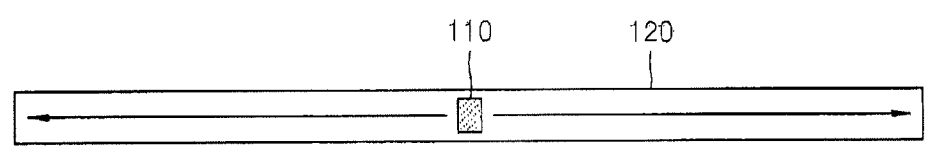
Figure 1D:
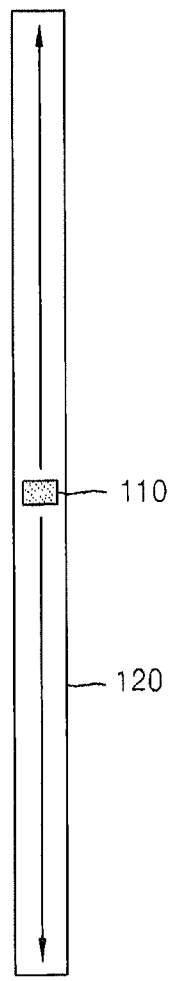

FIGS. 1A through 1D illustrate scroll bars according to embodiments of the present invention. Referring to FIG. 1A, the scroll bar includes a scroll pointer 110 (which is also referred to as a thumb, a knob, or a scroll box) and a moving region 120 for the scroll pointer 110. FIG. 1B illustrates a scroll bar that has a different form from the scroll bar illustrated in FIG. 1A. Specifically, the scroll bar of FIG. 1B includes a base line 130 through which the scroll pointer 110 is moved. A scroll bar illustrated in FIG. 1C includes a left and right moving region. Thus, the scroll pointer 110 of FIG. 1C moves in a left or a right direction. Conversely, a scroll bar illustrated in FIG. 1C includes an upward and downward moving region. Thus, the scroll pointer 110 of FIG. 1D moves upward or downward.

Figure 2A:
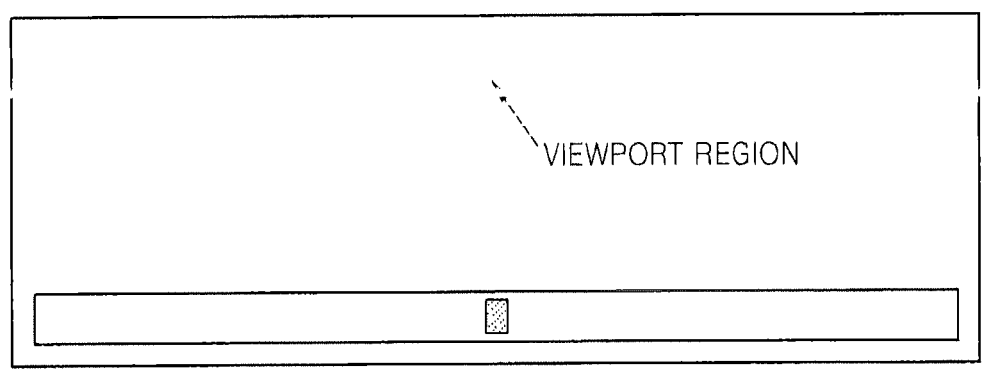
FIGS. 2A and 2B respectively illustrate a scroll bar and a slider displayed on a touch screen according to an embodiment of the present invention.
Figure 2B:
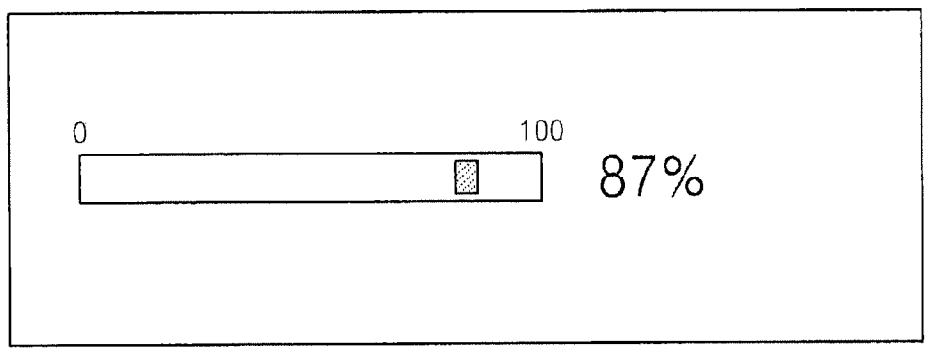

FIGS. 2A and 2B respectively illustrate a scroll bar and a slider displayed on a touch screen according to an embodiment of the present invention. Referring to FIG. 2A, the scroll bar generally scrolls locations on a screen. Referring to FIG. 2B, the slider changes a numerical information value. Thus, as illustrated in FIG. 2A, a view port region exists on a touch screen displaying the scroll bar and. Also, as illustrated in FIG. 2B, a numerical value displaying region representing the numerical value corresponding to the slider exists on a touch screen displaying the slider.

Figure 3:
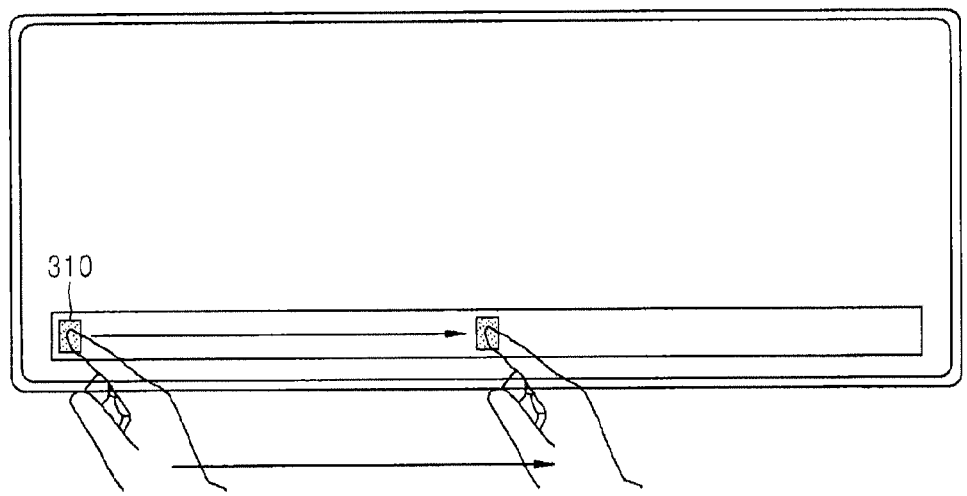
FIG. 3 illustrates a moving of a scroll pointer on a touch screen according to an embodiment of the present invention.

FIG. 3 illustrates a moving of a scroll pointer 310 on a touch screen according to an embodiment of the present invention. Referring to FIG. 3, the scroll pointer 310 is touched by a finger (or a device such as a touch screen pen) on the touch screen and the scroll pointer 310 moves from left to right.

Figure 4:
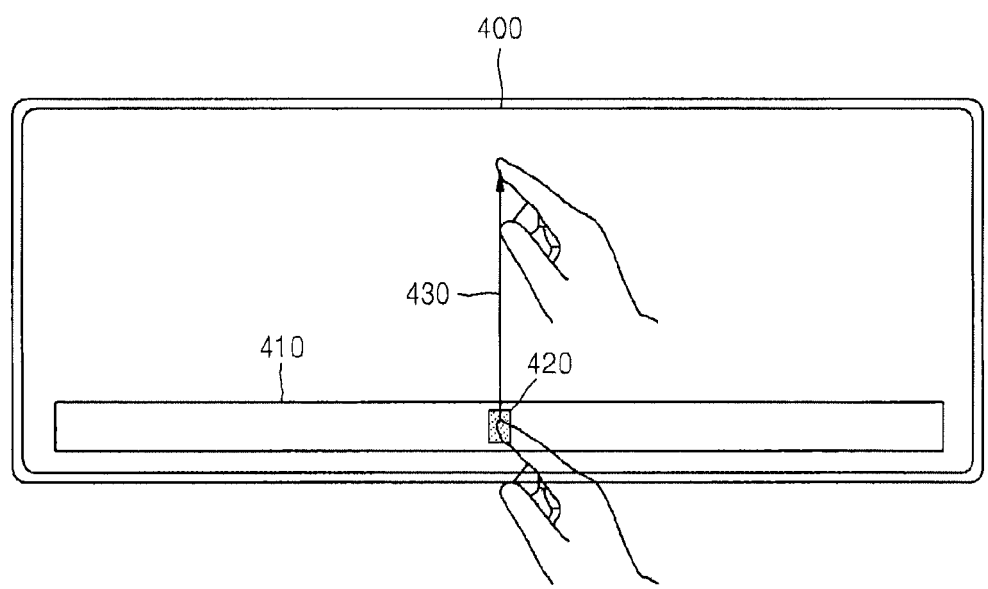
FIG. 4 is a conceptual diagram illustrating a method of controlling information scrolling on a touch screen according to an embodiment of the present invention.

FIG. 4 is a conceptual diagram illustrating a method of controlling information scrolling on a touch screen 400 according to an embodiment of the present invention. In the current embodiment, a zoom-in operation is embedded in the scroll bar. Referring to FIG. 4, when a scroll controlling menu is activated in a terminal, an information scroll controlling region 410 is displayed on the touch screen 400 in the form of a scroll bar and/or a slider. The scroll bar including a scroll pointer 420 may be displayed on an upper portion, a lower portion, or a center of the touch screen 400.

While the scroll pointer 420 is touched by a finger (or a touch screen pen), a touched point on the touch screen 400 is dragged in a direction 430 perpendicular to the moving direction of the existing scroll pointer or in a diagonal direction. When the location of the scroll pointer 420 being dragged is out of the moving direction (or moving region) of the existing scroll bar and/or slider, a scroll controlling region is expanded or reduced. In this case, dragging upward and dragging left and right can be simultaneously performed. It is understood that the expansion of the scroll controlling region 410 is not limited to an upward dragging, and may be realized in various other ways according to other aspects of the present invention. For example, the expansion of the scroll controlling region 410 may be realized by a dragging in any moving direction perpendicular to a moving direction of the scroll controlling region 410 (i.e., if the moving direction of the scroll controlling region 410 is upward and downward, then a dragging in a left and/or a right moving direction will expand the scroll controlling region 410).

Thus, according to aspects of the present invention, a scale of scrolling is expanded or reduced by one touch on the touch screen 400. Thus, information display locations on the touch screen 400 may be precisely adjusted.

Figure 5:
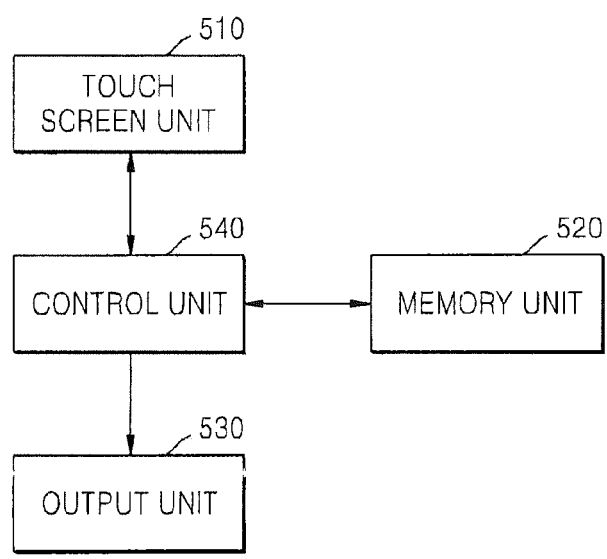
FIG. 5 is a block diagram of an apparatus to control information scrolling on a touch screen according to an embodiment of the present invention.

FIG. 5 is a block diagram of an apparatus to control information scrolling on a touch screen according to an embodiment of the present invention. Referring to FIG. 5, the apparatus to control information scrolling includes a touch screen unit 510, a memory unit 520, an output unit 530, and a control unit 540.

The touch screen unit 510 displays image information and senses a touching and/or a dragging performed by a user via sensors that react to a pressure applied to a surface of the touch screen unit 510. A method of sensing a touch on the touch screen unit 510 is well known and may be a pressure type method or a capacitance type method. Also, the touch screen unit 510 includes a graphic user interface (GUI) to control an information scroll controlling region.

The memory unit 520 stores multimedia contents and a predetermined form of GUI information for scroll controlling. The output unit 530 reproduces the multimedia contents using a screen and a speaker, and/or outputs the multimedia contents to one or more external devices.

The control unit 540 performs touching and dragging operations according to a touch and a drag sensed by the touch screen unit 510, displays an information scroll controlling region having a predetermined form on the touch screen unit 510, senses the touch on a scroll pointer of the information scroll controlling region, and performs a dragging operation at the location being touched. Also, when the location being dragged is outside of the moving direction of the existing scroll pointer in the touch screen unit 510, the control unit 540 expands or reduces the information scroll controlling region and adjusts corresponding content, parameters, and/or information (for example, information location and numerical values) in response to the change to the information scroll controlling region. As described above, the information scroll controlling region may be expanded or reduced in various ways according to aspects of the present invention.

Figure 6A:
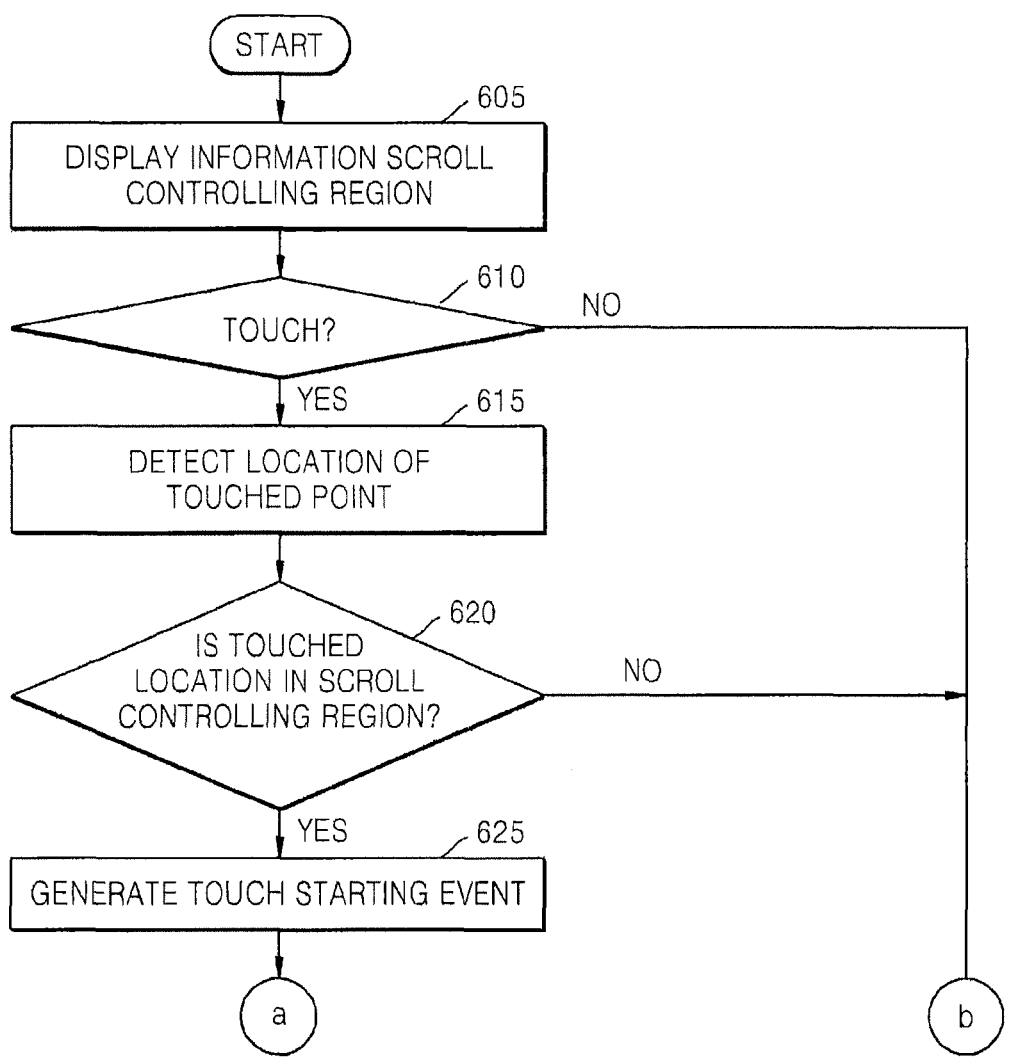
FIGS. 6A and 6B illustrate a flowchart of a method of controlling information scrolling on a touch screen according to an embodiment of the present invention.
Figure 6B:
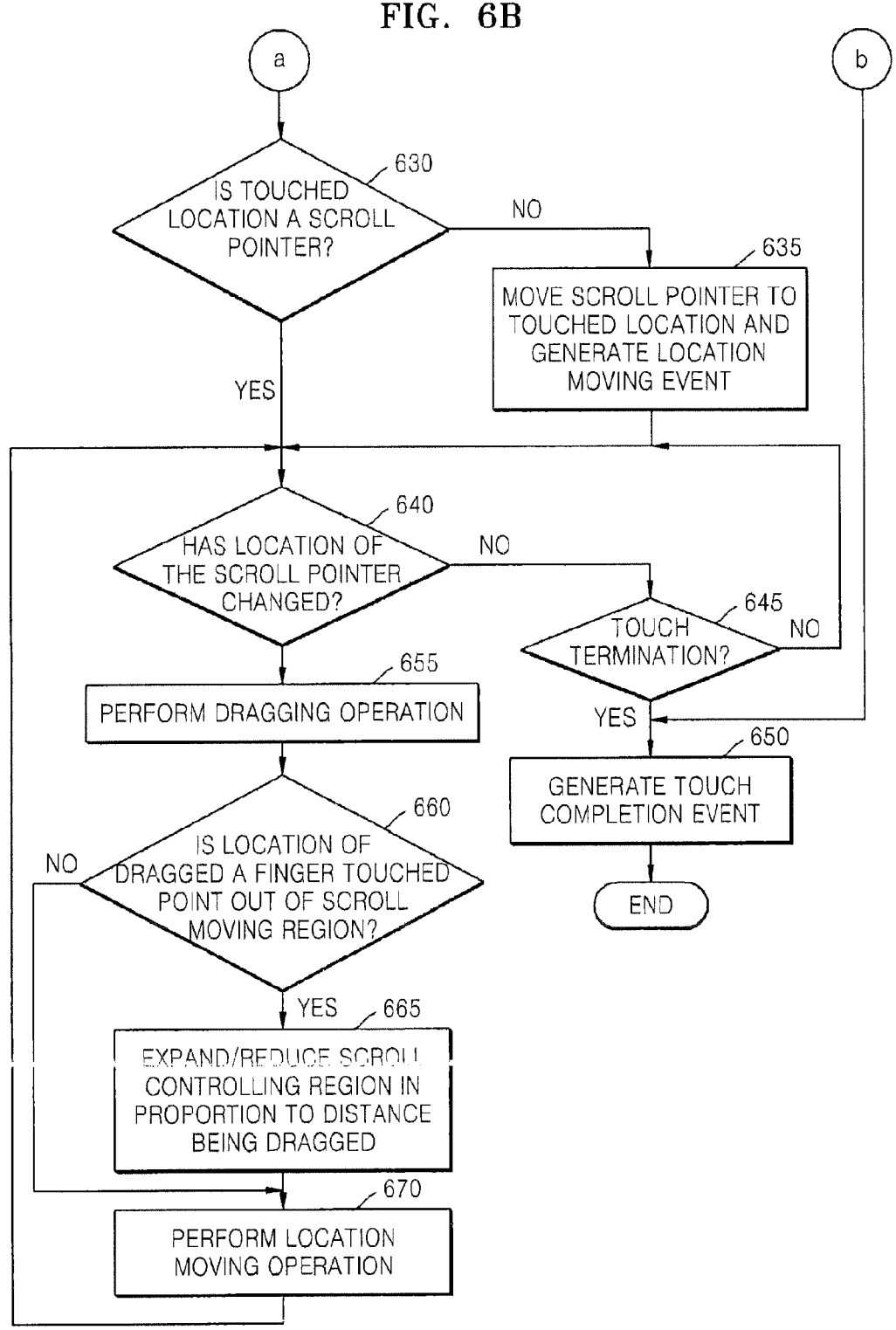

FIGS. 6A and 6B illustrate a flowchart of a method of controlling information scrolling on a touch screen according to an embodiment of the present invention. Referring to FIGS. 6A and 6B, when a scroll controlling menu is activated, the information scroll controlling region is displayed on the touch screen in the form of a scroll bar and/or a slider in operation 605. The information scroll controlling region may include the scroll pointer representing a current location on the screen and a scroll moving region. For example, assuming that a displayed content is a moving picture file, if the scroll pointer is located at a beginning of the information scroll controlling region, the start of the moving picture file is displayed on the viewport region. Conversely, if the scroll pointer is located at an end of the information scroll controlling region, the completion of the moving picture file is displayed on the viewport region.

When an object (such as at least one finger and a touch screen pen) contacts a specific region of the touch screen, the touch is sensed via a touch sensor in operation 610. Accordingly, when the touch on the touch screen is sensed, x and y coordinates of the touched point are calculated and the location of the touched point is detected in operation 615. Whether the touched location is in the scroll controlling region displayed on the touch screen is determined in operation 620.

When the touched location is determined to be in the scroll controlling region (operation 620), a touch starting event is generated in operation 625. Furthermore, when the touched location is determined to be in the scroll controlling region (operation 620), whether the touched location is the scroll pointer in the scroll controlling region is determined in operation 620. When the touched location is determined to not be the scroll pointer (operation 630), the scroll pointer is moved to the touched location and a location moving event is generated in operation 635.

Then, whether the location of the scroll pointer in the scroll controlling region is changed is determined in operation 640. When the location of the scroll pointer is determined to not be changed (operation 640), whether the touch is completed (for example, the finger or touch screen pen is removed from the touch screen) is determined in operation 645. As a result, when termination of the touch on the touch screen is sensed (operation 645), a touch completion event is generated. In this case, the scroll controlling region that is expanded or reduced at the time when the finger is lifted returns to an original scale (or magnification).

However, when the location of the scroll pointer is determined to be changed (operation 640), a dragging operation performed using the touch object is performed while the scroll pointer is being touched in operation 655. Specifically, a direction and/or a distance of the location being dragged from the location of the scroll pointer is calculated. Whether the location of the dragged touched point is out of a scroll moving region is determined in operation 660. For example, whether the touched location is dragged in a direction perpendicular to the existing scroll moving direction (90 degrees) or in a diagonal direction is sensed.

When the dragged location is determined to be out of the scroll moving region of the scroll pointer (operation 660), the scroll controlling region is expanded or reduced in proportion to the distance being dragged. Here, in the scroll bar, dragging upward dragging left and right can be simultaneously performed. For example, as illustrated in FIG. 4, assuming that a moving picture is being reproduced on the touch screen, the left side of the scroll controlling region is set to be the start of scrolling, the right side of the scroll controlling region is set to be the end of scrolling, and the dragging upward from the scroll controlling region is set to expand the scroll controlling region, when the touched point is dragged to the upper right side of the touch screen while the scroll pointer is touched by an object on the touch screen, the scroll controlling region is expanded and the playback position of the moving picture moves forward.

Also, according to aspects of the present invention, when the touched point is moved to both ends of the scroll controlling region in the expanded scroll controlling region, the location of the scroll pointer may not be moved while the scroll controlling region that is not displayed on the touch screen may be moved. Thus, the location of the content relating to the scroll controlling region is moved according to the scroll controlling region. As described above, the scroll controlling region may be expanded or reduced in various ways.

A location moving operation is performed in response to the change of the information scroll controlling region in operation 670. For example, the location of displayed information on the screen or numerical information values are adjusted according to the change of the expanded or reduced information scroll controlling region.

Figure 7A:
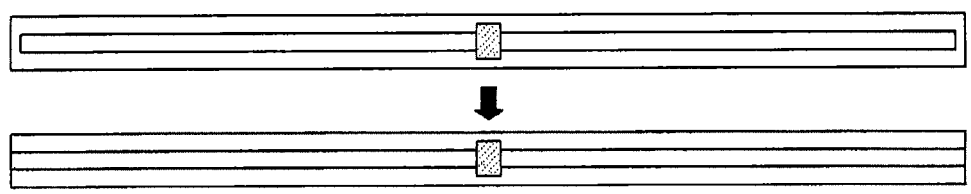
FIGS. 7A through 7D illustrate an expansion and a reduction of a scroll controlling region according to an embodiment of the present invention.

FIGS. 7A through 7D illustrate an expansion and a reduction of the scroll controlling region. Referring to FIG. 7A, a moving region of the scroll pointer is expanded to the left and to the right so that the scroll controlling region is expanded.

Figure 7B:
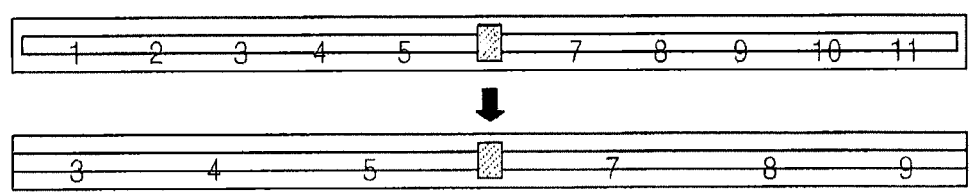

Referring to FIG. 7B, while the moving region of the scroll pointer is expanded to the left and to the right, the location and numerical values of standard values for the moving region of the scroll pointer are changed so that the scroll controlling region is expanded. For example, gaps between the location and numerical values of the standard values are expanded. The standard values may be expressed in a character string.

Figure 7C:
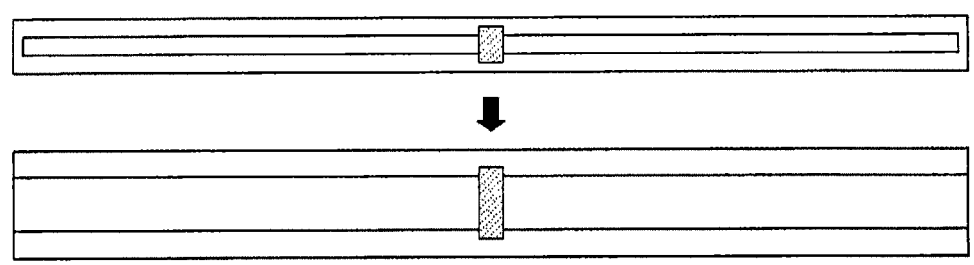

Referring to FIG. 7C, the scroll controlling region is expanded by increasing the left, right, upper, and lower sides of the scroll controlling region. Also, the region of the scroll pointer is expanded. However, it is understood that aspects of the present invention are not limited thereto. For example, according to other aspects, the scroll controlling region is only expanded along one side, two sides, or three sides.

Figure 7D:
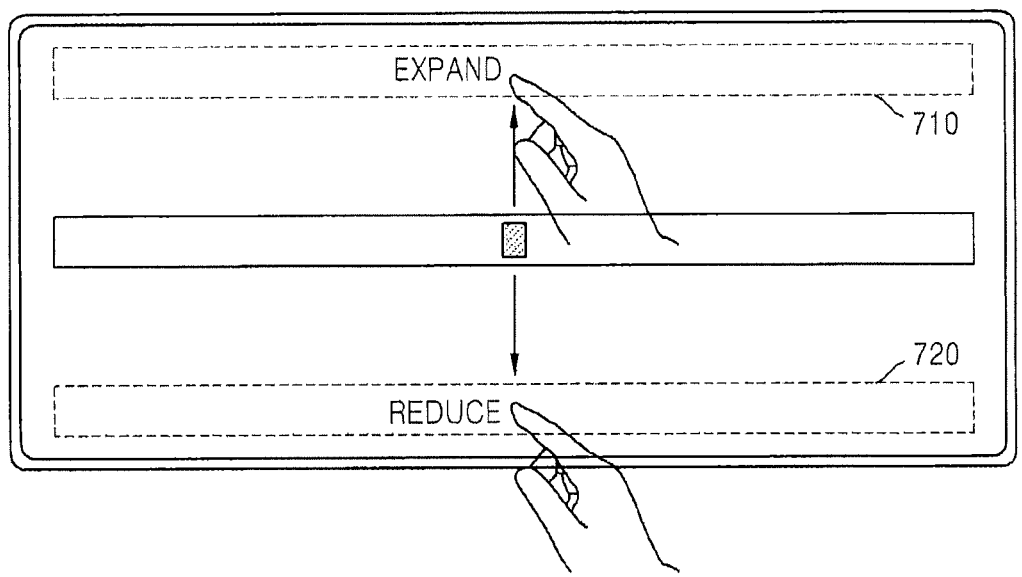

Referring to FIG. 7D, an expansion region 710 and a reduction region 720 for the scroll controlling region are set in the upper and lower side of the touch screen. When the touched point is dragged to the pre-set expansion region 710 or the reduction region 720, the scroll controlling region is expanded or reduced, respectively, to a limit value. Thus, when the object (for example, a finger or a touch screen pen) touches the added expansion region 710 or the added reduction region 720, the scroll controlling region is expanded or reduced, respectively.

Figure 8A:
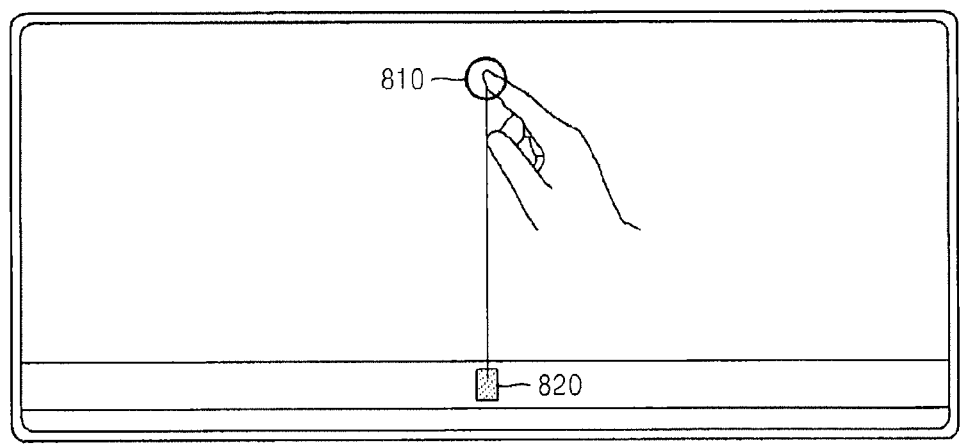
FIGS. 8A and 8B illustrate a displaying of a scroll pointer and a touched location according to an embodiment of the present invention.
Figure 8B:
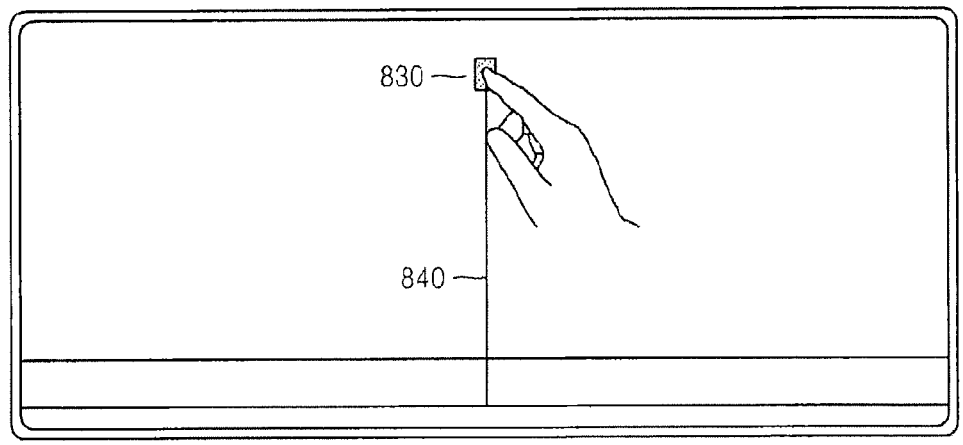

FIGS. 8A and 8B illustrate a displaying of a scroll pointer 820 and 830 and a touched location 810 according to an embodiment of the present invention. Referring to FIG. 8A, the location of the scroll pointer 820 and the touched location 810 that is being dragged are displayed on the touch screen. Referring to FIG. 8B, the scroll pointer 830 moves along with the object (for example, a finger) performing the dragging. The dragged location of the scroll pointer 830 is represented by a line 840 on the touch screen. Thus, a user may visually indentify the dragged location on the touch screen.

Aspects of the present invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus to control playback of multimedia contents, comprising:
    a touch screen to display an information scroll controlling bar and a scroll pointer, the information scroll controlling bar and the scroll pointer being included in an information scroll controlling region; and
    a controller to sense a touch at the scroll pointer on the touch screen, to sense a movement of the touch in a direction to a location outside the information scroll controlling region on the touch screen, to set a moving rate of the scroll pointer based on the sensed location outside the information scroll controlling region to control playback of multimedia contents, and to move the scroll pointer in a moving direction based on the direction of the movement.

2. The apparatus of claim 1, wherein the scroll pointer indicates a playback position of a multimedia content.

3. The apparatus of claim 1, wherein the direction is substantially perpendicular to the moving direction of the scroll pointer on the information scroll controlling bar.

4. The apparatus of claim 1, wherein the controller determines whether the touched location is in a scroll pointer region; and
    moves the scroll pointer to the touched location if it is determined that the touched location is not in the scroll pointer region.

5. The apparatus of claim 1, wherein the information scroll controlling bar is a single bar, and the scroll pointer is kept on the information scroll controlling bar.

6. The apparatus of claim 1, wherein the scroll controlling region is changed to another control region responsive to the sensed movement.

7. The apparatus of claim 1, wherein the movement of the touch in a different direction from the moving direction of the scroll pointer sets the moving rate while continuously touching on the touch screen.

8. An apparatus to control playback of multimedia contents, comprising:
    a touch screen to display a playback track bar and a track pointer on the playback track bar, the track pointer indicating a playback position of a multimedia content and the track pointer being movable at a first scrolling rate while a touch on the track pointer is dragged along the playback track bar; and
    a controller to sense a dragging of the touch on the touch screen from the track pointer to a location outside the playback track bar, the track pointer being kept on the playback track bar, and to move the track pointer on the playback track bar at a second scrolling rate if the touch on the touch screen is dragged from the location, the second scrolling rate being different from the first scrolling rate and dependent at least partly upon a distance of the location from the playback track bar.

9. The apparatus of claim 8, wherein the second scrolling rate is proportional to the distance in relation with the dragged location on the touch screen.

10. The apparatus of claim 8, wherein the track pointer being placed on a first end portion of the track bar corresponds to a playback start of the multimedia content, and the track pointer being placed on a second end portion of the track bar corresponds to a playback end of the multimedia content.

11. The apparatus of claim 8, wherein the touch screen comprises a capacitive touch screen.

12. A method for controlling playback of multimedia contents on a touch screen of a computing device, the method comprising:
    displaying an information scroll controlling bar and a scroll pointer on the touch screen, the information scroll controlling bar and the scroll pointer being included in an information scroll controlling region, the scroll pointer indicating a playback position of a multimedia content;
    sensing a dragging of a touch point in a direction substantially perpendicular to a moving direction of the scroll pointer on the information scroll controlling bar after a touch is sensed at the scroll pointer; and
    if at least a part of the dragging is performed in a multimedia content display region outside the information scroll controlling region, setting a scrolling rate of the scroll pointer on the information scroll controlling bar based on a dragged location as a result of the dragging.

13. The method of claim 12, wherein the information scroll controlling bar is a single bar, and the scroll pointer is kept on the information scroll controlling bar.

14. At least one non-transitory computer readable medium comprising computer readable instructions that control at least one processor to implement the method of claim 12.

15. An apparatus to control playback of multimedia contents, comprising:
    a touch screen to display an information scroll controlling bar and a scroll pointer, the information scroll controlling bar and the scroll pointer being included in an information scroll controlling region and the scroll pointer indicating a playback position of a multimedia content; and
    a controller to sense a dragging of a touch point in a direction substantially perpendicular to a moving direction of the scroll pointer on the information scroll controlling bar after a touch is sensed at the scroll pointer, and to set a scrolling rate of the scroll pointer on the information scroll controlling bar based on a dragged location as a result of the dragging when at least a part of the dragging is performed in a multimedia content display region outside the information scroll controlling region.

16. The apparatus of claim 15, wherein the information scroll controlling bar is a single bar, and the scroll pointer is kept on the information scroll controlling bar.

17. The apparatus of claim 1, wherein the scroll pointer is movable at an initial moving rate while the touch on the scroll pointer is dragged along the information scroll controlling bar and the set moving rate is lower than the initial moving rate.

18. The apparatus of claim 8, wherein the second scrolling rate is lower than the first scrolling rate.

19. The method of claim 12, wherein the scroll pointer is movable at an initial scrolling rate while the touch on the scroll pointer is dragged along the information scroll controlling bar and the set scrolling rate is lower than the initial scrolling rate.

20. The apparatus of claim 15, wherein the scroll pointer is movable at an initial scrolling rate while the touch on the scroll pointer is dragged along the information scroll controlling bar and the set scrolling rate is lower than the initial scrolling rate.

* * * * *